US011138522B1

(12) United States Patent
Ross et al.

(10) Patent No.: US 11,138,522 B1
(45) Date of Patent: *Oct. 5, 2021

(54) ALLOCATING RESOURCES FOR A MACHINE LEARNING MODEL

(71) Applicant: Google LLC, Mountain View, CA (US)

(72) Inventors: Jonathan Ross, Mountain View, CA (US); John Michael Stivoric, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/827,376

(22) Filed: Mar. 23, 2020

Related U.S. Application Data

(63) Continuation of application No. 15/859,077, filed on Dec. 29, 2017, now Pat. No. 10,685,295.

(60) Provisional application No. 62/440,357, filed on Dec. 29, 2016.

(51) Int. Cl.
| | |
|---|---|
| *G06N 20/00* | (2019.01) |
| *G06F 9/50* | (2006.01) |
| *G06F 9/48* | (2006.01) |
| *G06F 8/41* | (2018.01) |

(52) U.S. Cl.
CPC ........... *G06N 20/00* (2019.01); *G06F 9/4887* (2013.01); *G06F 9/505* (2013.01); *G06F 9/5016* (2013.01); *G06F 8/41* (2013.01)

(58) Field of Classification Search
CPC ..... G06N 20/00; G06F 9/4887; G06F 9/5016; G06F 9/505; G06F 8/41
See application file for complete search history.

(56) References Cited

U.S. PATENT DOCUMENTS

| | | | |
|---|---|---|---|
| 7,409,689 B2 | 8/2008 | Jones | |
| 9,122,522 B2 * | 9/2015 | Hartog | ................. G06F 9/4881 |
| 10,152,349 B1 * | 12/2018 | Anand | ................. G06N 5/003 |
| 10,606,645 B2 | 3/2020 | Vernier | |
| 2008/0092113 A1 | 4/2008 | Weinstein | |
| 2013/0160017 A1 | 6/2013 | Hartog | |

(Continued)

OTHER PUBLICATIONS

'cloud.google.com' [online] "Cloud Storage Pricing," Last updated Jun. 11, 2018, [retrieved on Jun. 19, 2018] Retrieved from Internet: URL< https://cloud.google.com/storage/pricing#operations-pricing> 14 pages.

*Primary Examiner* — Jacob D Dascomb
(74) *Attorney, Agent, or Firm* — Fish & Richardson P.C.

(57) ABSTRACT

A method for allocating resources for a machine learning model is disclosed. A machine learning model to be executed on a special purpose machine learning model processor is received. A computational data graph is generated from the machine learning model. The computational dataflow graph represents the machine learning model which includes nodes, connector directed edges, and parameter directed edges. The operations of the computational dataflow graph is scheduled and then compiled using a deterministic instruction set architecture that specifies functionality of a special purpose machine learning model processor. An amount of resources required to execute the computational dataflow graph is determined. Resources are allocated based on the determined amounts of resources required to execute the machine learning model represented by the computational dataflow graph.

12 Claims, 5 Drawing Sheets

(56) References Cited

U.S. PATENT DOCUMENTS

| | | |
|---|---|---|
| 2014/0282572 A1 | 9/2014 | Kang |
| 2016/0103677 A1* | 4/2016 | Melski .................. G06F 9/5038 717/120 |
| 2016/0358103 A1* | 12/2016 | Bowers ................. G06F 9/4881 |
| 2017/0177312 A1* | 6/2017 | Boehm .................. G06N 20/00 |
| 2018/0081720 A1 | 3/2018 | Zlatanchev |
| 2018/0129967 A1 | 5/2018 | Herreshoff |
| 2018/0165400 A1 | 6/2018 | Feld |
| 2019/0205792 A1 | 7/2019 | Huang |

\* cited by examiner

ALLOCATING RESOURCES FOR A MACHINE LEARNING MODEL

CROSS-REFERENCE TO RELATED APPLICATION

This application is a continuation of and claims priority to U.S. patent application Ser. No. 15/859,077, filed on Dec. 29, 2017, which claims priority to U.S. Provisional Application No. 62/440,357, filed on Dec. 29, 2016. The disclosure of the prior application is considered part of and is incorporated by reference in the disclosure of this application.

BACKGROUND

This specification relates to allocating resources for machine learning model tasks.

Machine learning models receive input and generate output based on the received input and on values of model parameters. Machine learning tasks usually require many resources to execute and complete. However, the exact amount of resources that a machine learning model requires is hard to predict since resource allocation and performance may vary among devices executing the machine learning tasks.

SUMMARY

This specification describes technologies for allocating resources for machine learning model tasks. These technologies generally involve determining, at compile-time of the machine learning model executable binaries, the amount of resources that a machine learning model will use during execution on a special purpose machine learning model processor. By knowing the amount of resources a machine learning model will use, a processing system can efficiently schedule machine learning model executable binaries to execute on special purpose machine learning model processors.

Typically, the amount of resources necessary to execute a single machine learning model is unpredictable since each processing device may optimize the machine learning model differently. Since resource allocation and performance are not predictable, there is currently no way to reliably determine the resources that a machine learning model will use during execution on a customary device. The subject matter described below solves this problem by providing a system that determines, at compile-time, the amount of resources that a machine learning model will use during execution on a special purpose machine learning model processor. The determination is based, in part, on the processing of deterministic metrics to facilitate the efficient scheduling of binaries for the machine learning models.

The subject matter described in this specification can be implemented in particular embodiments so as to realize one or more of the following advantages. By compiling a representation of a machine learning model using deterministic instruction set architecture, a processing system can determine, at compile-time, the amount of resources that a machine learning model will use during execution on a special purpose machine learning model processor. In particular, the example processing system can determine the number of operations, the amount of storage, and the amount of input/output that a machine learning model requires to communicate information that the model will use during execution.

An example processing system determines the amount of resources that a machine learning model will use during execution and then uses this determination to allocate resources for a single machine learning model on a special purpose machine learning model processor or in a datacenter. The processing system can allocate different machine learning models for a particular machine learning task or allocate resources for machine learning models executing different tasks to run together on a processor. Because the amount of resource usage can be determined in a deterministic manner, a pricing model that charges consumers per machine learning operation will likewise provide users with cost estimates that are highly accurate so that consumers can make informed cost decisions with a very high degree of certainty.

The resource usage knowledge can also be used to improve processing efficiency on a single special purpose machine learning model processor chip. By knowing the operations per second and the IO per second required of a model at compile time, special purpose machine learning model processors can load-balance models automatically for optimal model execution.

Additionally, data center efficiency can be improved. As in the above example, a data center may know how many operations, IO, and storage is required by each machine learning model the data center needs to execute. By knowing the resource use of each machine learning model, the data center can adjust resources, and efficiently schedule machine learning models to load-balance models automatically. This execution information can thus be used to optimize the data center costs in terms of financial and physical resources.

Knowing the resources required to execute a specific machine learning model also allows for performing computations on allocated, but unused, resources. If operations are allocated per time period to one machine learning model, but there are no requests for that model during the time period, the unused resources may be provided to a second machine learning model until a request for the first machine learning model is received by the special purpose machine learning model processor. The allows for a very efficient allocation of resources that would otherwise be idle.

Knowing the resources required to execute a specific machine learning model also allows for machine learning model quality and quantity to be adjusted to provide results to a user. For example, for a given machine learning task, there may be several types of models that can complete the task. Some machine learning models may be more computationally precise or more intensive and therefore require more operations to be modeled. Models can be rebalanced based on usage, timing, the number of operations (or resources) a model requires, and the precision necessary to perform a machine learning task. By knowing the resource requirement for each machine learning model type, the most efficient combinations of machine learning model types may be used to complete a task that optimizes special purpose machine learning model processor resources.

Moreover, knowing exactly the resources required to execute a single machine learning model allows a system to provide highly precise computational pricing models. Instead of selling storage bytes, CPU or GPU resources in device units, the system may implement an operational pricing unit for operations of special purpose machine learning model processors, machine learning multidimensional array flow operations, and the like. In addition to providing a new pricing paradigm, the system also provides an incentive to develop computationally efficient processes.

BRIEF DESCRIPTION OF THE DRAWINGS

Like reference numbers and designations in the various drawings indicate like elements.

DETAILED DESCRIPTION

Machine learning tasks are computationally intensive and usually require numerous resources for execution. Such resources include input/output (IO), memory, and operations. Resource allocation and device performance for a given binary are not typically predictable across processing devices, and thus it is difficult to determine the amount of resources that a particular machine learning model will use during execution.

An example processing system executes machine learning models on special purpose machine learning model processors. Each special purpose machine learning model processor is a custom programmable artificial intelligence (AI) accelerator built for machine learning applications. The processor has a deterministic instruction set architecture (ISA) and can be tailored for multi-dimensional array flow operations. In some implementations, the multi-dimensional array flow operations can be implemented using a software library for numerical computation using data flow graph.

As a result of compiling with a deterministic ISA, the processing system determines, at compile-time, the amount of resources that a machine learning model will use during execution on special purpose machine learning model processors. Using this knowledge, the processing system can allocate resources to a particular machine learning model for execution.

Figure 1:
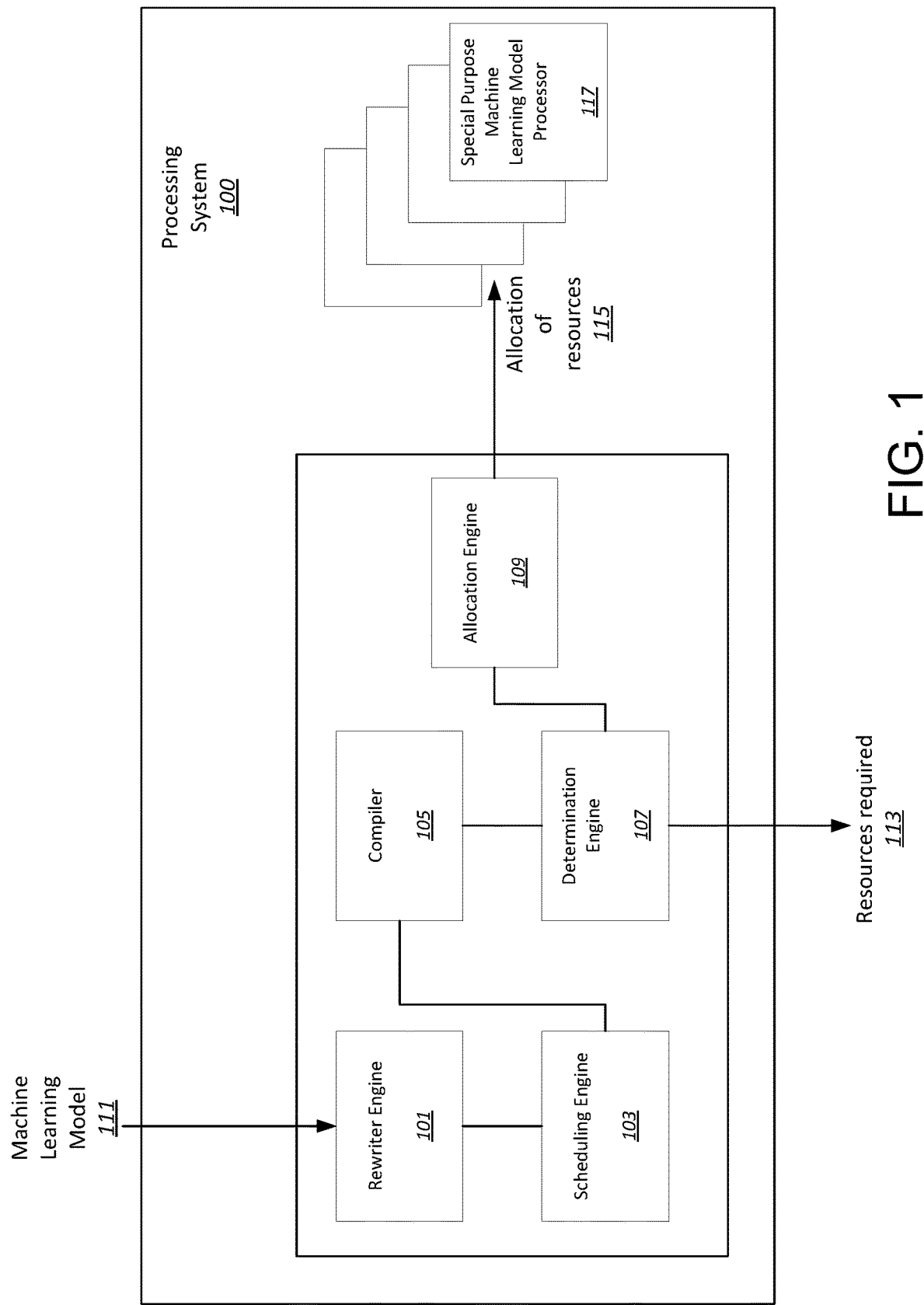
FIG. 1 illustrates an example processing system.
Figure 2:
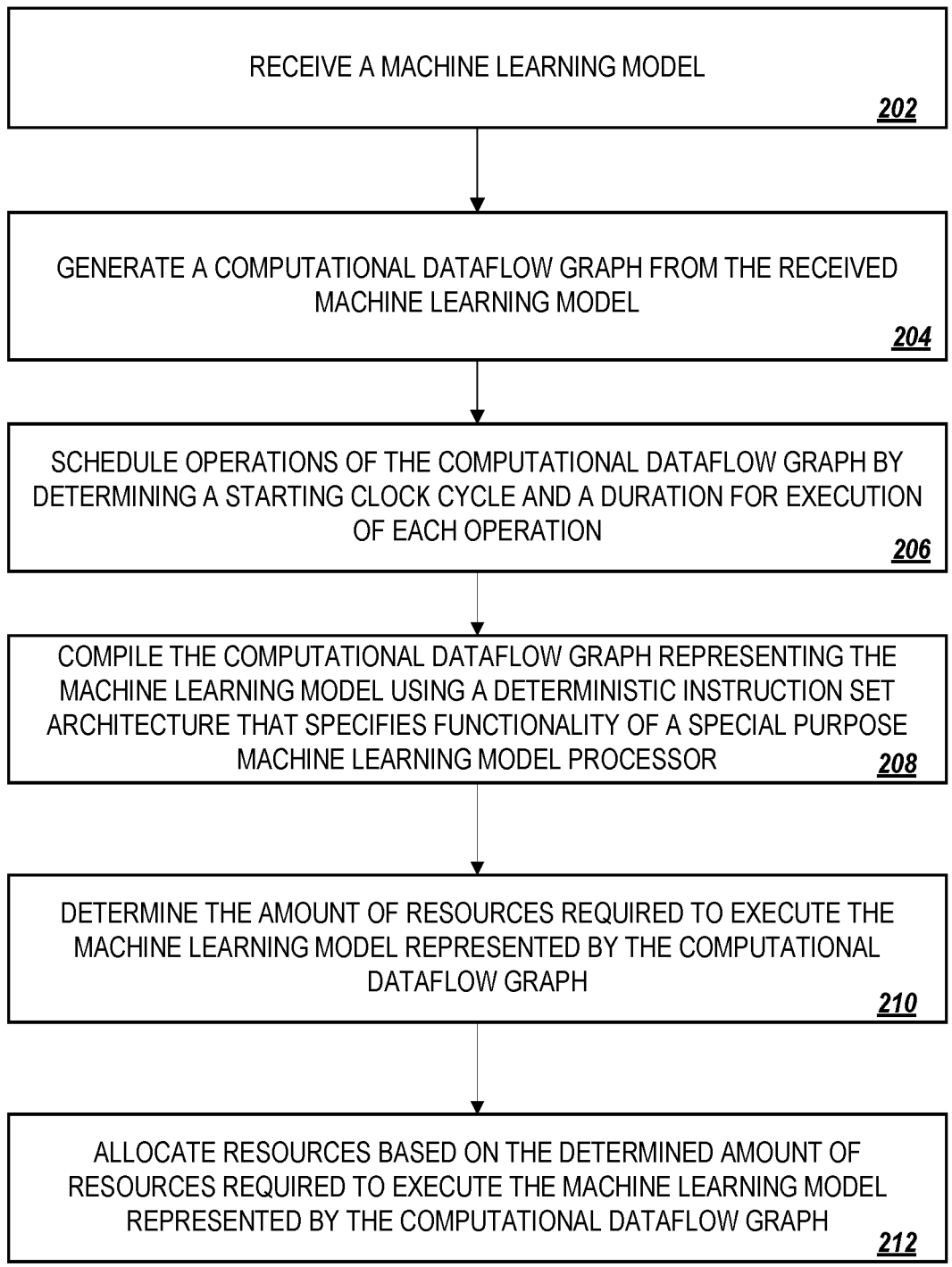
FIG. 2 is a flowchart of an example process for allocating resources of a special purpose machine learning processor for a single machine learning model.

FIG. 1 illustrates an example processing system (100). The processing system (100) is an example of a system implemented as computer programs on one or more computers in one or more locations, in which the systems, components, and techniques described below are implemented. Operation of the processing system (100) is described with reference to FIG. 2, which is a flowchart 200 of an example process for allocating resources of a special purpose machine learning processor for a single machine learning model. For convenience, the process 200 will be described as being performed by a system of one or more computers, located in one or more locations, and programmed appropriately in accordance with this specification. For example, an example processing system, e.g., the processing system 100 of FIG. 1, appropriately programmed, can perform the process 200.

The processing system (100) receives a machine learning model to be executed on a special purpose machine learning processor (202). The processing system (100) includes a rewriter engine (101) that receives the machine learning model (111) as input. The processing system (100) then generates a computational dataflow graph from the received machine learning model (204). This transforms the machine learning model (111) into a computational dataflow graph. To execute on a special purpose machine learning model processor, the processing system (100) rewrites the machine learning model using operations represented by a node in the computational graph, i.e., multidimensional arrays and flow operations, that support the arrays on a defined pathway to create a computational graph representation of the model.

A computational dataflow graph expresses computations of a machine learning model with nodes representing operations and directed edges representing dependencies between operations. An incoming edge to a node represents a flow of an input into the node, i.e., an input argument to the operation represented by the node. If all arguments required for an operation are available to the operation node, the node is enabled and can be executed.

An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

Generally, the input and outputs flowing along directed edges in the computational graph are tensors. A tensor is a multidimensional array of numeric values or other values, e.g., strings, having a specific order that corresponds to the dimensionality of the array. For example, a scalar value is a 0th-order tensor, a vector of numeric values is a 1st-order tensor, and a matrix is a 2nd-order tensor.

The operations represented in the computational graph are neural network operations or operations for a different kind of machine learning model. The operations represented by the computational graph may be operations necessary for the machine learning model to compute an inference, i.e., to process an input through the layers of the machine learning model to generate model output for the input.

The processor (100) schedules operations of the computational dataflow graph by determining a starting clock cycle and an execution duration for each operation (206). After the rewriter engine (101) has rewritten a machine learning model into a computational dataflow graph, a scheduling engine (103) schedules the operations of the computational graph operations. The processing system (100) can determine a starting clock cycle and the execution duration of each operation based on the deterministic instruction set architecture of the special purpose machine learning model processors (117). In particular, due the deterministic features of the special purpose machine learning model processors (117), each of computational graph operations has a known resource requirement for completion. Thus, the computational graph operations are used to determine the execution durations.

The system (100) can schedule operations of the computational dataflow graph using the determined starting clock cycle and duration. The scheduling is likewise based on the deterministic nature of the computational graph operations in the context of the deterministic instruction set architecture.

The processing system (100) then compiles the computational dataflow graph representing the machine learning model into an executable binary using a deterministic instruction set architecture that specifies functionality of a special purpose machine learning model processor (208). A compiler (105) compiles the scheduled computational graph into an executable binary. The special purpose machine learning model processor for which the executable binary is created has a deterministic instruction set architecture. Therefore, the processing system (100) can, at compile-time, determine the execution requirements of the computational graph representation of the machine learning model (210).

Each computational graph representation of a machine learning model executing on the special purpose machine learning model processor has certain resource requirements that may be accounted for. Examples of such resource requirements include a number of operations to be performed, the amount of storage the machine learning model requires to execute, and the amount of input/output (IO) the model requires to communicate information the model will use during execution.

The processing system (100) allocates resources of the special purpose machine learning model processor based on the determined amount of resources required by the executable binary (212). A determination engine (107) determines the resource requirements (113) for executing a machine learning model using the executable binary created from the scheduled, computational dataflow graph representation of the model. This information can be provided as output from the processing system (100). Additionally or alternatively, the processing system (100) uses the resource required for a machine learning model (113) to allocate resources (115) for the machine learning model (113). An allocation engine (109) identifies the special purpose machine learning model processors (117) and available resources in a datacenter that the processing system (100) can allocate to the machine learning model. The processing system (100) then allocates the special purpose processors (117) and other resources to the computational graph representation of the machine learning model for execution. The allocated special purpose machine learning model processors (117) then execute the operations of the computational dataflow graph representation to complete the machine learning task of the machine learning model.

A computational graph representation of a machine learning model has the same performance across all special purpose machine learning model processors of the same version because each processor has a deterministic ISA. Therefore, the number of operations, amount of IO, and amount of storage, required to execute a machine learning model represented as a computational graph for one special purpose machine learning model processor are the same for all processors. As described above, these resource requirements are known at compile time, in advance of execution. Therefore, the resource requirements of the machine learning model are predictable across versions of the special purpose machine learning model processors.

There are numerous benefits to knowing, at compile time, the resource requirements of executing an executable binary of a computational dataflow graph representing a single machine learning model. For example, with this knowledge, an example system can improve processing efficiency on a single special purpose machine learning model processor chip by executing machine learning models together.

Figure 3:
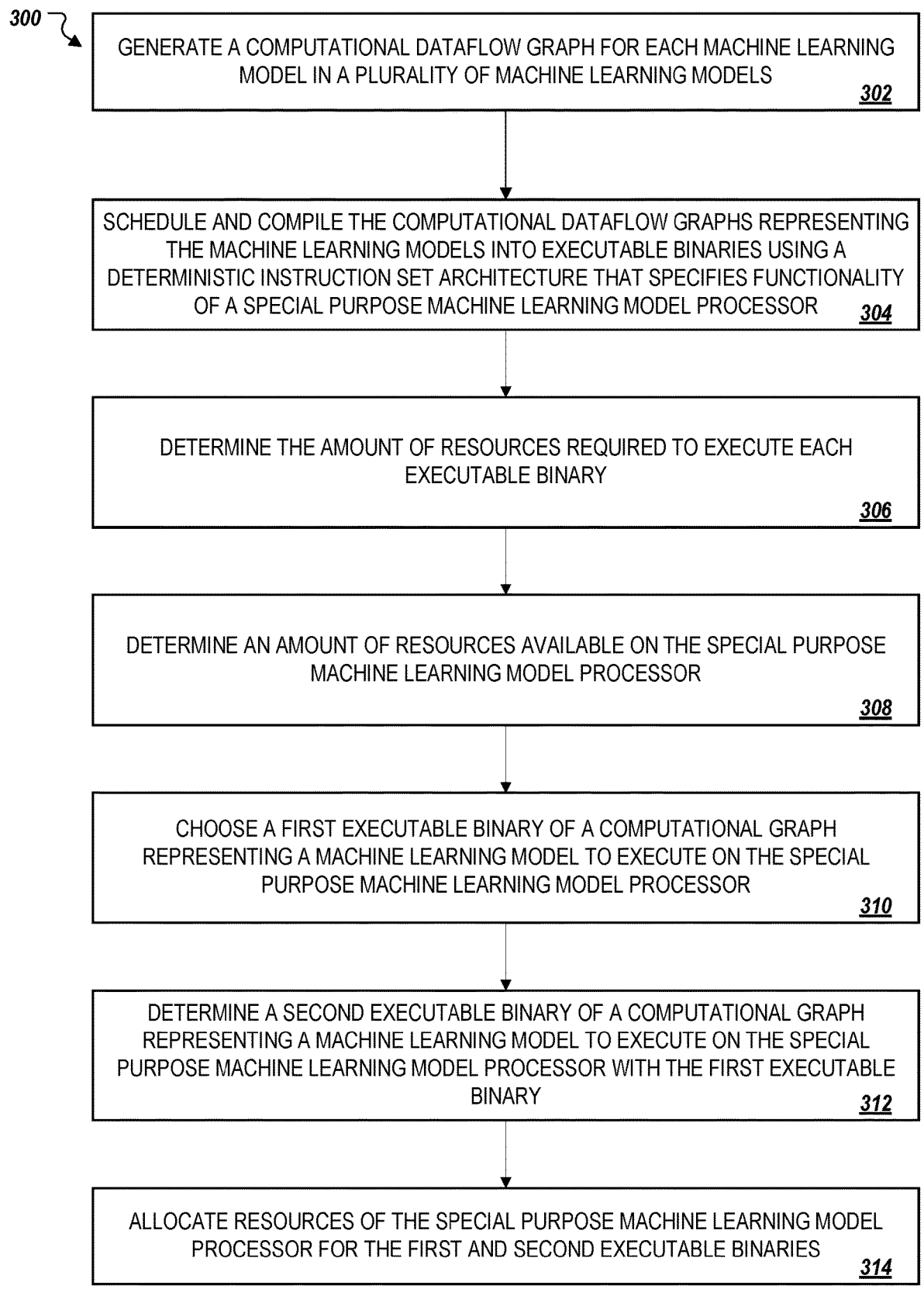
FIG. 3 is a flowchart of an example process for allocating resources of a special purpose machine learning model processor to execute multiple machine learning models on the processor.

FIG. 3 is a flowchart of an example process 300 for allocating resources of a special purpose machine learning model processor to execute multiple machine learning models on the processor. For convenience, the process 300 will be described as being performed by a system of one or more computers, located in one or more locations, and programmed appropriately in accordance with this specification. For example, an example processing system, e.g., the processing system 100 of FIG. 1, appropriately programmed, can perform the process 300.

The processing system (100) receives multiple machine learning models that need to execute on special purpose machine learning processors. As discussed above with respect to FIG. 2, the processing system first generates computational graphs for each machine learning model (302) and then schedules and compiles the graphs into executable binaries using a deterministic instruction set architecture that specifies functionality of a special purpose machine learning model processor (304). The example processing system determines the amount of resources required by each machine learning model (306). The system also determines an amount of resources available on a special purpose machine learning model processor (308).

The processing system chooses a first executable binary of a computational graph representing a machine learning model to execute on the special purpose machine learning model processor (310). The processing system (100) then determines the amount of unallocated resources of the special purpose machine learning model processor, and then, based on the unallocated resources, selects determines a second executable binary of a second computational graph representing a second machine learning model to execute on the special purpose machine learning model processor with the first executable binary (312). Because the resources required for each binary are known, and the deterministic processing requirements for each special purpose machine learning model processor are also know, the processing system (100) can allocate any second executable binary whose resource requirements are met by the unallocated resources remaining in the special purpose machine learning processor after the resources for the first executable binary has been allocated.

For example, one computational graph representing a machine learning model may need to perform 20,000 operations per unit time and use 30 gigabytes per unit time of input/output (IO) to communicate information. Another computational graph representing a second model may need to perform 80,000 operations per unit time and use 10 gigabytes per unit time of IO. If an example special purpose machine learning model processor can perform 100,000 operations per unit time and has 100 gigabytes per unit time of IO, these two models can be run together. By knowing the operations per unit time and the IO per unit time required of a model at compile time, an example system can load-balance special purpose machine learning model processors automatically for optimal model execution.

Another benefit to knowing the amount of resources necessary to run a machine learning model is improving data center efficiency. As described above, an example system can determine the amount of resources necessary to run each machine learning model. Special purpose machine learning model processors can be tasked with a specific number of machine learning model operations. Thus the number of operations, the amount of IO, and the amount of storage required to execute the operations of computational dataflow graphs representing machine learning models that are assigned to execute in the datacenter may be known with a high degree of precision.

Figure 4:
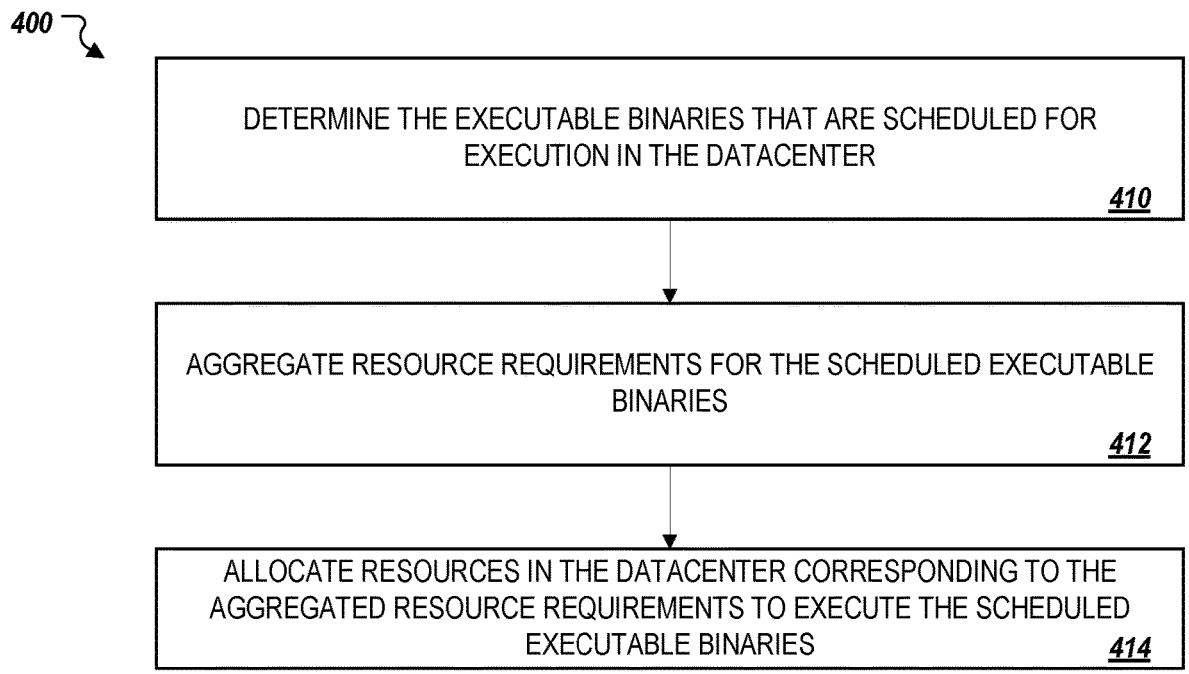
FIG. 4 is a flowchart of an example process for allocating resources of a datacenter to execute multiple machine learning models in the datacenter.

FIG. 4 is a flowchart of an example process 400 for allocating resources of a datacenter to execute multiple machine learning models in the datacenter. For convenience, the process 400 will be described as being performed by a system of one or more computers, located in one or more locations, and programmed appropriately in accordance with this specification. For example, an example processing system, e.g., the example processing system 400 of FIG. 1, appropriately programmed, can perform the process 400. An example datacenter determines the executable binaries that are scheduled for execution in the datacenter (410). The datacenter then aggregates the resource requirements for the scheduled executable binaries (412) and allocates resources in the datacenter corresponding to the aggregated resource requirements to execute the scheduled executable binaries (414). The processes 200 and 300 of FIGS. 2 and 3 may be used as constituent allocation processes for allocating the resources of the data center.

Resources allocated in the data center can be reallocated and machine learning models can be rescheduled to load-balance machine learning operation tasks automatically throughout the datacenter. The load-balancing process is based, in part, on the knowledge of the resource use of each machine learning model assigned to a datacenter. A datacenter controller can adjust the performance settings of the datacenter to efficiently handle the number of operations, the amount of IO required, and the amount of storage that has been allocated across all machine learning models assigned to execute in the datacenter. An example processing system can use this resource requirement information for each machine learning model assigned to the datacenter to optimize the datacenter by minimizing the amount of resources required to execute the machine learning models assigned to the datacenter. An example system can optimize settings such as latency requirements, power requirements, etc. For example, latency can be minimized by achieving a highest allocation of processing resources in the datacenter. Conversely, power can be conserved by allocating only a certain percentage of the deterministic processing capabilities at a particular time.

An example system can also use resource requirements to execute a specific machine learning model on allocated, but unused resources of a special purpose machine learning model processor. For example, operations may be allocated for a time period to one machine learning model on the special processor. However, the example processing system may not have any requests scheduled for the machine learning model during that period. Therefore, the processing system may execute a computational dataflow graph representation of a second machine learning model on the unused resources of the special processor until a request from the first machine learning model is received. If the special purpose machine learning model processor has enough IO resources, the processor may leave the operations of the second machine learning model in memory when it receives a request to execute the first model. Additionally or alternatively, the special purpose machine learning model processor can checkpoint the execution of the second machine learning model to return to a certain position after the special purpose machine learning model processor has executed the request for the first machine learning model.

An example system can also use resource requirements of machine learning models to adjust the machine learning model quality and quantity for a specific machine learning model task. For example, a customer may specify a certain level of precision for a calculation resulting from a machine learned model operation, or may not require a result by a certain time. Thus, inferences can be scheduled over a longer time period, and only the necessary quantity to achieve the precision desired by the customer may be performed.

Figure 5:
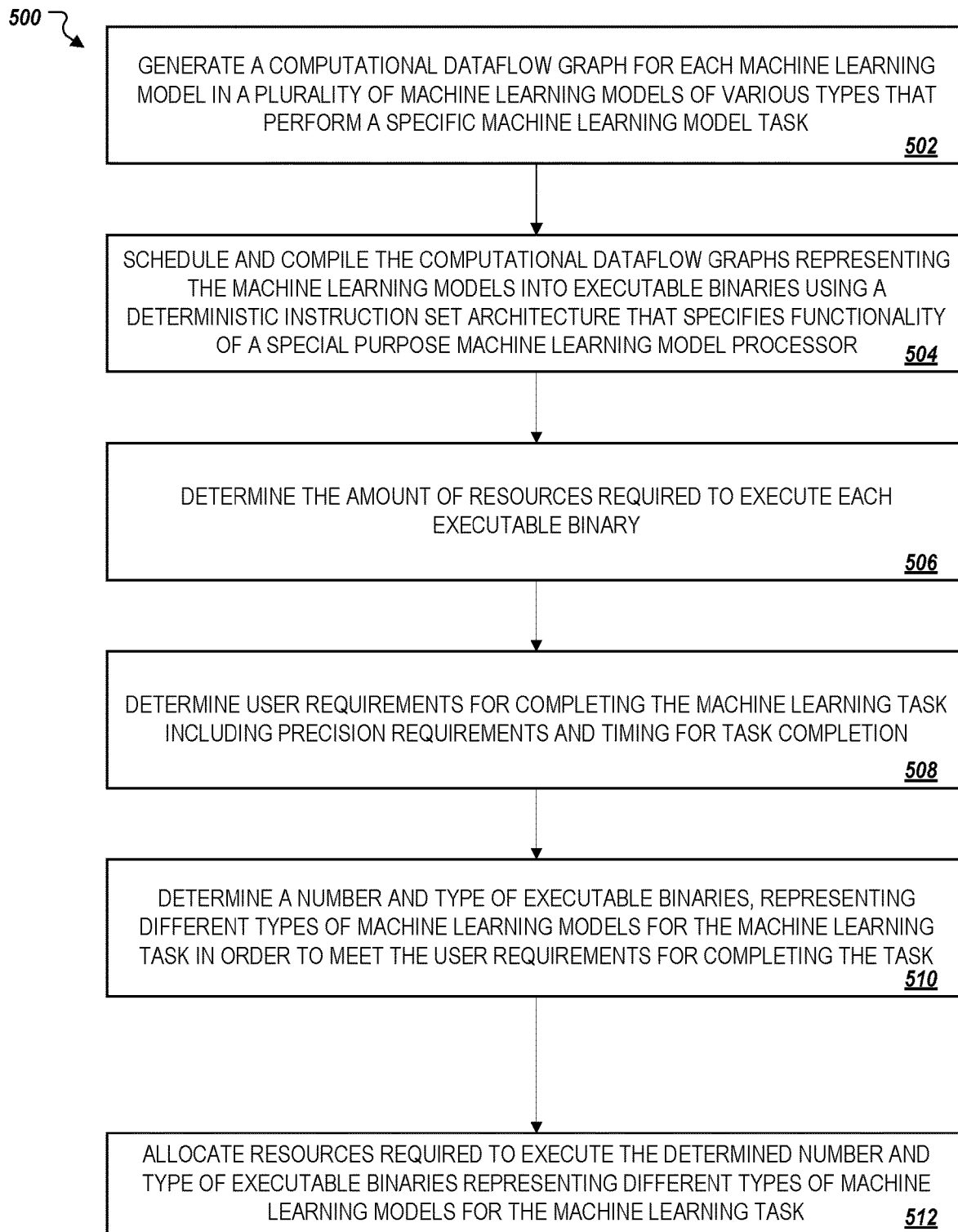
FIG. 5 is a flowchart of an example process for allocating different types of machine learning models for a machine learning task.

FIG. 5 is a flowchart of an example process 500 for allocating different types of machine learning models for a machine learning task. For convenience, the process 500 will be described as being performed by a system of one or more computers, located in one or more locations, and programmed appropriately in accordance with this specification. For example, an example processing system, e.g., the processing system 100 of FIG. 1, appropriately programmed, can perform the process 500.

An example processing system generates a computational dataflow graph for each machine learning model from numerous machine learning models of various types that perform a specific machine learning model task (502). For a given machine learning task, there may be several different types of machine learning models that complete the task. Some machine learning models may be more computationally precise or more computationally intensive and therefore require more resources during execution. The machine learning models assigned to a specific machine learning model task can be rebalanced based on usage, timing, the number of resources a model requires, and the precision necessary to perform a machine learning task.

The processing system schedules and compiles the computational dataflow graphs representing the machine learning models into executable binaries as described above (504). The system then determines the amount of resources that are required to execute each executable binary (506). The example processing system determines the user requirements for completing the machine learning task including precision requirements and timing for task completion (508). The processing system determines the number and type of executable binaries, representing different types of machine learning models for the machine learning task to meet the user requirements for completing the task. Additionally or alternatively, the example processing system can maximize performance and efficiency of the machine learning model task by choosing the optimal combination of machine learning models that will run the machine learning task. This can be done, for example, by determining the machine learning model task requirements and obtaining the amount of machine learning model allocation resources available on a special purpose machine learning model processor or a datacenter (510). The example processing system then allocates the resources required to execute the determined number and type of executable binaries representing different types of machine learning models for the machine learning task (512).

In some implementations, a user has access to remotely-located special purpose machine learning model processors. These processors can be provided to a user using a pricing model that is different from pricing models of customary processing devices. Typically, central processing unit (CPU) resources or graphics processing unit (GPU) are priced in units of devices. Instead of pricing units of special purpose machine learning model processors, an example pricing model can price operations of computational dataflow graphs representing machine learning models. An example pricing model can price special purpose processing for each operation of the computation, and not for bytes of storage or networking. This pricing model allows machine learning tasks, such as computing inferences, to be sold at granular intervals. For example, a customer can purchase exactly five-hundred executions of a model every one millisecond for a specific machine learning model. An example pricing model may price operations based on priority, with lower priority operations that can wait to complete being less expensive. Pricing may additionally or alternatively be based on raw quota or model execution operations scheduled over a long period of time.

Discounts can be given to customers whose machine learning operations run in off-peak times or that fill in gaps between other machine learning model operations. For example, a company may pay for a certain amount of special processor resources for a month to run specific machine learning tasks. However, during evening hours and on weekends during the month, the company may not have any machine learning task requests. Therefore, the special purpose machine learning model processors allocated to the company are available for other processing requests during these time periods. An educational institution may pay a discount rate to run its machine learning model tasks on the available processor resources at off-peak times or at a lower priority than the primary priority of the company.

In some implementations, an example processing system tries to optimize a machine learning model so that its computational graph representation makes the most efficient use of special purpose machine learning model processors and other resources. However, some machine learning model operations cannot be optimized at compile time and therefore have the potential to execute using a range of resources. For these machine learning models, customers may be charged for the worst-case execution time resource use. However, special purpose machine learning model processors may determine the best resource allocation at runtime to minimize resource use, e.g., reduce latency or save power.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for allocating resources for a machine learning model, the method comprising:
    receiving a machine learning model to execute on a special purpose machine learning model processor;
    compiling, with a deterministic instruction set architecture that specifies functionality of the special purpose machine learning model processor, the machine learning model to provide a schedule of operations, each operation having a defined starting clock cycle and duration;
    determining, based on the schedule of operations, an amount of resources required to execute the machine learning model; and
    allocating resources of the special purpose machine learning model processor based on the determined amounts of resources required to execute the machine learning model.

2. The method of claim 1, wherein the determined amount of resources required to execute the machine learning model comprises a number of operations to be performed.

3. The method of claim 1, wherein the determined amount of resources required to execute the machine learning model comprises an amount of storage the machine learning model requires to execute.

4. The method of claim 1, wherein the determined amount of resources required to execute the machine learning model comprises an amount of input/output communications required for executing the machine learning model.

5. The method of claim 1, wherein compiling the machine learning model comprises:
    generating a computational graph for the machine learning model; and
    scheduling and compiling the computational graph into executable binaries.

6. The method of claim 1, comprising executing the machine learning model on the special purpose machine learning model processor after allocating the resources of the special purpose machine learning model processor.

7. A system comprising one or more computers and one or more storage devices storing instructions that are executable by the one or more computers to cause the one or more computers to perform the operations of:
    receiving a machine learning model to execute on a special purpose machine learning model processor;
    compiling, with a deterministic instruction set architecture that specifies functionality of the special purpose machine learning model processor, the machine learning model to provide a schedule of operations, each operation having a defined starting clock cycle and duration;
    determining, based on the schedule of operations, an amount of resources required to execute the machine learning model; and
    allocating resources of the special purpose machine learning model processor based on the determined amounts of resources required to execute the machine learning model.

8. The system of claim 7, wherein the determined amount of resources required to execute the machine learning model comprises a number of operations to be performed.

9. The system of claim 7, wherein the determined amount of resources required to execute the machine learning model comprises an amount of storage the machine learning model requires to execute.

10. The system of claim 7, wherein the determined amount of resources required to execute the machine learning model comprises an amount of input/output communications required for executing the machine learning model.

11. The system of claim 7, wherein compiling the machine learning model comprises:
   generating a computational graph for the machine learning model; and
   scheduling and compiling the computational graph into executable binaries.

12. The system of claim 7, wherein the operations further comprise executing the machine learning model on the special purpose machine learning model processor after allocating the resources of the special purpose machine learning model processor.

* * * * *